(12) United States Patent
Gueugnaut et al.

(10) Patent No.: US 8,507,832 B2
(45) Date of Patent: Aug. 13, 2013

(54) METHOD OF REPAIRING IN SITU A PIPE OR TANK OF THERMO-FUSIBLE MATERIAL, AND DEVICE FOR IMPLEMENTING THIS METHOD

(75) Inventors: Dominique Gueugnaut, Paris (FR); Irene Corral-Hernandez, Paris (FR); Jean Le Coguic, Montmagny (FR); Alain Darut, Chatou (FR)

(73) Assignee: Gaz de France, Paris (FR)

( * ) Notice: Subject to any disclaimer, the term of this patent is extended or adjusted under 35 U.S.C. 154(b) by 734 days.

(21) Appl. No.: 11/204,651

(22) Filed: Aug. 16, 2005

(65) Prior Publication Data
US 2006/0037955 A1 Feb. 23, 2006

(30) Foreign Application Priority Data

Aug. 20, 2004 (FR) ..................................... 04 09024

(51) Int. Cl.
*H05B 3/58* (2006.01)
*H05B 3/44* (2006.01)
*H05B 6/10* (2006.01)
*H05B 1/00* (2006.01)
*F16L 13/02* (2006.01)
*F16L 55/16* (2006.01)

(52) U.S. Cl.
USPC ........... 219/535; 219/221; 219/544; 219/633; 285/21.1; 138/98; 138/99

(58) Field of Classification Search
USPC .................... 219/535, 633, 221, 544; 138/98, 138/99; 285/21.1, 21.2, 35, 337, 354, 359, 285/369
See application file for complete search history.

(56) References Cited

U.S. PATENT DOCUMENTS

| 2,506,574 | A | * | 5/1950 | Boydstun ...................... 219/535 |
| 3,022,209 | A | * | 2/1962 | Campbell ...................... 156/158 |
| 3,062,940 | A | * | 11/1962 | Holzer et al. .................. 219/544 |
| 3,315,986 | A | * | 4/1967 | Quick ........................... 285/21.1 |
| 4,163,145 | A | * | 7/1979 | Neff .............................. 219/523 |
| 4,918,292 | A | * | 4/1990 | Nussbaum et al. ........... 219/492 |

(Continued)

FOREIGN PATENT DOCUMENTS

| DE | 42 09 522 | 3/1993 |
| EP | 0 924 053 | 6/1999 |

(Continued)

OTHER PUBLICATIONS

Machine translation of Japan Patent document No. 8-247,378, Jan. 2011.*

(Continued)

*Primary Examiner* — Joseph M Pelham
*Assistant Examiner* — Gyounghyun Bae
(74) *Attorney, Agent, or Firm* — Ladas & Parry LLP (57) ABSTRACT

A method of repairing in situ a pipe or tank of thermo-fusible material, with a step for installing an electric heating element, the heating element including electrical conductors, and with a step for supplying said conductors with appropriate electric energy. The electrical conductors are supplied by a control panel set up prior to the repair and matching, for different thermo-fusible materials and different types of damage of the pipe or tank to be repaired, at least one technical characteristic of the pipe or tank, one characteristic of the electric energy to be applied and a profile of the application time of the electric energy.

20 Claims, 6 Drawing Sheets

(56) References Cited

U.S. PATENT DOCUMENTS

| | | | | |
|---|---|---|---|---|
| 5,003,163 | A | * | 3/1991 | Jensen ............................ 219/535 |
| 5,064,994 | A | * | 11/1991 | Urban ............................. 219/233 |
| 5,137,591 | A | * | 8/1992 | Gansbuehler et al. ........... 156/86 |
| 5,369,248 | A | | 11/1994 | Dufour et al. |
| 5,407,520 | A | * | 4/1995 | Butts et al. ................... 156/379.7 |
| 5,410,131 | A | * | 4/1995 | Brunet et al. .................. 219/535 |
| 6,278,096 | B1 | * | 8/2001 | Bass ............................. 219/629 |
| 6,313,449 | B1 | | 11/2001 | Smith et al. |
| 6,386,236 | B1 | * | 5/2002 | Buckley ............................ 138/99 |
| 6,407,370 | B2 | * | 6/2002 | Sauron et al. .................. 219/535 |
| 6,781,099 | B2 | * | 8/2004 | Krah .............................. 219/544 |
| 2001/0050278 | A1 | * | 12/2001 | Chenault ........................ 219/497 |
| 2003/0192875 | A1 | * | 10/2003 | Bieker et al. ................... 219/528 |

FOREIGN PATENT DOCUMENTS

| | | | |
|---|---|---|---|
| EP | 1 262 272 | | 12/2002 |
| FR | 2 695 173 | | 3/1994 |
| GB | 2 302 490 | | 1/1997 |
| JP | 04 224396 | | 8/1992 |
| JP | 08247378 | A * | 9/1996 |
| JP | 11254539 | A * | 9/1999 |
| JP | 11 304080 | | 11/1999 |
| JP | 11304080 | A * | 11/1999 |
| JP | 2000 035184 | | 2/2000 |
| WO | WO 93 10962 | | 6/1993 |

OTHER PUBLICATIONS

Development of Spin Friction Equipment and Internal Seal Tools for Repairing Polyethylene Gas Pipes; SwRI Project No. 06-2975, prepared by S.C. Grigory for Gas Research Institute Contract No. 5088-271-1822; GRI-98/0339, Nov. 1998.

Development of Linear Vibration Friction Techniques for Repairing Polyethylene Gas Pipes; SwRI Project No. 06-2975, prepared by S.C. Grigory for Gas Research Institute Contract No. 5088-271-1822, GRI-98/0340, Nov. 1998.

Development of a Heat Fusion patch Technique and a New PERM Material for Repairing Polyethylene Gas Pipes, SwRI Project No. 06-2975, prepared by S.C. Grigory for Gas Research institute Contract No. 5088-271-1822, GRI-98/0341, Nov. 1998.

Development of Cast-in-Place Modling Techniques for Repairing Polyethylene Gas Pipes, SwRI Project No. 06-2975, prepared by S.C. Grigory for Gas Research Institute Contract No. 5088-271-1822, GRI-98/0342, Nov. 1998.

B.F. 3238 Brevet en France, "Filet Formant Resistance De Chauffage, Applications De Ce Filet Au Thermosoudage De Tubes Aboutes Et Au Raccordement Transversal De Canalisations, Ensembles Ainsi Constitues Et Prise De Branchement Electrosoudable Equippe D;Un Tel Filet", Au Nom De Gaz De France, No. 92 04415, Du 10 Avril 1992.

* cited by examiner

METHOD OF REPAIRING IN SITU A PIPE OR TANK OF THERMO-FUSIBLE MATERIAL, AND DEVICE FOR IMPLEMENTING THIS METHOD

BACKGROUND OF THE INVENTION

The invention relates to a method of repairing in situ a transport or distribution pipe of thermo-fusible material inside which a fluid such as water or gas is carried, as well as a device for repairing in situ a pipe of thermo-fusible material.

The invention also relates to a method of repairing in situ a tank of thermo-fusible material in which a fluid such as water or gas is stored, as well as a device for repairing in situ such a tank.

The invention therefore relates to the field of repair work on a damaged section of a pipeline or pipe of thermo-fusible material or on a tank of thermo-fusible material, in which pipe or tank a fluid is carried or is stored. Said fluid can be flammable and/or explosive. It can also be under pressure. For example, it can be natural gas.

The great majority of distribution systems, particularly as concerns the distribution of city gas or natural gas, are composed of pipes or tubes of polyethylene or polyamide, polybutylene, polypropylene or polyvinylchloride. To assemble such tubes, there are several existing techniques. For example, one consists of heating the ends of two tubes placed facing each other until the thermo-fusible material is sufficiently fluid so that the two ends, pressed lightly against each other, fuse together and form a joint that is appreciably sealed to the gas and with a mechanical strength compatible with the use of the pipes to be formed.

This assembly technical can also be applied, in a similar way, to form a tank from elements made of thermo-fusible material.

Pipes and tanks of thermo-fusible material, which have been used in France since the middle of the 1970s, show good resistance of this material over time, at least with respect to piping in gas distribution systems. However, because of possible accidental damage to these pipes and tanks, it is necessary to have methods of in-situ repair that avoid, in so far as possible, the systematic complete replacement of a damaged section of a pipe or the complete replacement of a tank that would seriously affect the operation of the system.

To simplify the reading of the following text, and to make it easier to understand, the present invention will be described below only in reference to pipe of thermo-fusible material, although this does not indicate a limitation of the field of application to this sole example.

Pipe of thermo-fusible material can be damaged in different ways. One such way results from a puncture of a section so that it is no longer impervious. In this situation, the complete replacement of the section is nearly inevitable.

Another way causes internal or external damage of the pipe, although it remains impervious for the short term (external cracks or gouges, creation of internal micro-fissures by a repair operation by partially flattening the pipe).

Currently, in order to attempt to repair such pipe, within the scope of a repair operation by partially flattening, an electrically weldable reinforcing saddle is installed, the purpose of which is only to locally reinforce the damaged area and the welding of which can be tricky because of the ovalization of the pipe.

For economic and technical reasons, the installation of a reinforcing saddle is not used to repair external damages (such as a gouge).

With respect to said gouges, the generally accepted threshold for damage is around 10% of the wall thickness for pipe under pressure, for example.

However, the current lack of knowledge of how the accuracy of this value affects the reduction in service life of damaged pipe does not allow all borderline cases to be handled confidently, that is, those cases in which the depth of the defect is very close to the aforementioned value.

The object of the invention is to propose a method of repairing in situ a pipe or tank of thermo-fusible material, that is simple to implement, does not result in special expenses and which makes it possible to obtain a reliable and durable repair of a section of pipe or a damaged tank that could avoid having to systematically replace the whole section or the damaged tank.

SUMMARY OF THE INVENTION

Advantageously, the method of the invention should make it possible to carry out the repair of the pipe or tank without necessarily emptying it first.

Other repair techniques have already been developed, particularly for the repair of polyethylene pipe.

Thus, according to a first technique, a part made of modified polyethylene is melted by friction by applying high frequency alternate translational motion by means of a suitable external generator. The polyethylene part is then applied, in its melted state, to the damaged section. However, this technique has two disadvantages. The first is that it is necessary to have available different types of pipe parts in order always to have an element suitable to the configuration of the pipe to be repaired. The second concerns the repair elements, which must be of a standard material in order to be adaptable to any kind of polyethylene according to the specific material of the pipe to be repaired. At the same time, this first technique is difficult to apply to pipes of small diameter.

According to a second technique, the melting of a modified polyethylene element is obtained by friction, not by translation but by fast rotation. Other than the fact that this second technique preferably applies to cases in which the defects go all the way through, that is, involving the whole thickness of the pipe, like the first technique this second technique requires the use of a resurfacing material. Moreover, both of these techniques require a means to be put in place to serve as a gasket to prevent the flow of the polyethylene when the part melts from the effect of friction.

Furthermore, both the first and second techniques seem more suitable for repairing defects that go all the way through, defects that are not very representative and which are also generally dealt with by replacing the damaged section. This limits both of these techniques to applications not under load, and they are thus detrimental to the normal operation of the system.

According to a third technique, a mold is placed on the section of pipe to be repaired and melted polyethylene is injected into it. In principle this technique is similar to an injection method, making it necessary to have several molds suitable for all diameters of pipe to be repaired and requiring the use of large, heavy equipment, particularly for the injection of the melted polyethylene. This third technique, like the first two, seems completely unsuitable for the repair of damaged pipe of small diameter.

According to a fourth technique, a reinforcing saddle is welded to the pipe at the site of the defect, which saddle is composed of a modified polyethylene of improved fluidity, heated first by means of a tool. This technique is derived from the conventional technique of welding and requires the manufacture of a complete range of reinforcing saddles from a modified polyethylene, for all diameters existing in a distribution system.

Each of these four techniques is described in more detail in documents published in November 1998 by Gas Research Institute, Chicago, Ill., U.S.A., specifically referenced GRI-98/0340, GRI-98/0339, GRI-98/0342 and GRI-98/0341.

With regard to the tools or means of heating used to melt the parts made of thermo-fusible material, some documents, such as FR-A-92 04 415 and FR-A-92 10 450 describe a mesh forming a heating resistance in the form of a jacket embedded in the thickness of a connecting part made of thermo-fusible material. This mesh allows plastic pipes to be thermo-welded to each other, particularly water pipes and taps. Its use is not suggested for any repair. A completely different technique is described in the document WO-A-93/10962. According to this technique, the thermo-fusible material is heated by microwaves, which again involves rather significant and expensive equipment.

To alleviate the disadvantages of the different techniques mentioned above, and more particularly to make it possible to repair in situ a tank or pipe in which a fluid such as a flammable gas is stored or carried, the present invention proposes a method with a step for installing an electric heating element intended to completely cover the damage to be repaired, the heating element comprising electrical conductors, and with a step for supplying said conductors with appropriate electric energy, and a cooling step.

According to the invention, the electrical conductors are supplied by a control panel set up prior to the repair and matching, for different thermo-fusible materials and different types of damage of the pipe or tank to be repaired, at least one technical characteristic of the pipe or tank, one characteristic of the electric energy to be applied and a profile of the application time of the electric energy.

The method of the invention is also based on a moderate and local heating of the damaged area of a pipe of thermo-fusible material, particularly polyethylene, by means of an electrical heating element such as a metal mesh made of a metal alloy such as copper, forming a heating resistance, covering the entirety of the damaged area, with no contribution of resurfacing material. The supply of the heating element conductors with appropriate electric energy is advantageously accomplished, although not exclusively, by automatic machines such as automatic welding machines like those used to perform welding by electrofusion, either manually or automatically.

The technical characteristic of the pipe or tank to be repaired, according to which the application of the electric energy is adjusted, is primarily the wall thickness of the pipe or tank.

The profile for the application time of the electric energy includes at least one phase of heating the damaged area and at least one phase of cooling the damaged area.

During heating, the electric energy is applied to the electric conductors either with a set value of voltage or with a set value of current intensity.

It is still possible to control this energy by means of a set value of temperature imposed on the heating element.

The profile for the application time of the electric energy is based on controlling at least three parameters, such as the voltage delivered by the automatic machine, the time during which this voltage is applied and the temperature of the heating element.

The selection parameters of the heating-cooling cycle can be adapted for repairing damage on the outer surface of the pipe (gouges, cracks), or those located within the thickness of the pipe or tank (voids, inclusions), or on the inner surface of the pipe or tank (flattened-straightened areas, extrusion defects); in all cases, these defects do not go through the wall.

In the case of a pipe or tank damaged by a defect that does not open through the inner surface, such as a gouge, the method of the invention makes it possible locally to reach at least the melting point of the thermo-fusible material in the damaged area to be repaired, at a depth that can be up to 50% of the thickness. Indeed, the melting that makes it possible to repair the defect does not affect the inner surface of the pipe, which can thus withstand the pressure when the fluid is under pressure, so as not to affect the continuity of operation of the system.

In the case of a pipe or a tank damaged internally, the method of the invention makes it possible locally to reach an annealing temperature less than, for example close to [sic], the softening point of the thermo-fusible material that the pipe or tank is made of, allowing the partial or total regeneration of the original microstructure of the material.

In all cases, the temperature of the material comprising the inner surface of the pipe or tank is always lower than the softening point thereof.

The method of the invention allows the temperature of the heating element to be controlled, and thus the temperature of the thermo-fusible material in the area to be repaired, so that the pipe or tank is not completely softened and can continue functioning.

According to various additional characteristics of the method of the invention, the management of the heat flux generated by the heating-cooling cycle can be optimized. For example, this can be done by adding an insulating layer mounted on the heating element.

According to another additional characteristic, the cooling phase comprises a controlled cooling of the area or of the damage to be repaired. The heating-cooling cycle comprises a natural cooling or a controlled cooling, depending on the maximum temperature reached, and thus, depending on the nature of the defect to be repaired, the heating element may or may not remain in place around the repaired area.

Moreover, to prevent the heating element from becoming embedded in the thermo-fusible material, the heating element is advantageously covered by a heat conducting device, such as, an aluminum sheet mounted on the heating element.

In order to achieve maximum automation of the method of the invention, the profile of the application time of the electric energy is advantageously controlled, for example, by an automatic welding machine that includes a means of introducing at least one criterion for regulating the electrical energy to be applied. Said means of introducing a criterion can be a bar code reader, for example.

The automation can be controlled, for example, from technical data contained in an appropriate medium such as a bar code or an electronic chip.

In many cases, the profile of the application time of the electric energy is controlled in accordance with a control system of at least three parameters, i.e., the voltage with which the electric energy is applied, the time of application of this energy and the temperature of the heating element. However, this control system can be supplemented so that it also includes the cooling temperature and/or speed.

The object of the invention is also achieved with a device for repairing in situ a pipe or a tank of thermo-fusible material, said device comprising an electric heating element intended to completely cover the damage of the area to be repaired, the heating element having electrical conductors, an adjustable source to supply said conductors with an appropriate electric energy, the adjustment being accomplished by a control panel set up prior to the repair, and matching, for different thermo-fusible materials and different types of damage of the pipe or tank to be repaired, at least one technical characteristic of the pipe or tank, one characteristic of the electric energy to be applied and a profile of the application time of the electric energy.

Advantageously, the device of the invention comprises a means for applying the electric energy to the electrical conductors either with a set value of voltage, or a set value of current intensity, or according to specifically designed current curves.

According to an additional characteristic, the device of the invention comprises a means of regulating the cooling of the area to be repaired.

The method of the invention, as well as the device of the invention, provide the possibility of repairing pipes or tanks of thermo-fusible material both when they are damaged externally, i.e., in the thickness, or internally and particularly when they are on-load and when the fluid carried is a flammable gas under pressure.

Other characteristics and advantages of the present invention will be seen from the following description of one form of implementation of the method of the invention and of the device used in said implementation.

BRIEF DESCRIPTION OF THE DRAWING FIGURES

The description of the form of implementation and of the device will be supplemented by diagrams shown in the drawings. In said drawings:

FIG. 2 illustrates the repair of a pipe for structural defects the depth of which is less than b, and micro-structural defects (such as micro-fissures) for the additional depths.

DETAILED DESCRIPTION OF THE PREFERRED EMBODIMENTS

When a pipe 10 made of thermo-fusible material must be repaired, in which pipe a fluid such as a flammable gas is carried, according to the method of the invention an electric heating element 1 is installed, such as a knitted mesh of copper alloy wire forming an electrical resistance and coated with a material that acts as a circuit breaker, for example by melting. This heating element 1, which is shaped so as to be able to completely cover the damaged section of the pipe 10, has electrical conductors 2, 3 connected to this mesh and intended to be connected to a power supply device 20 to supply the electric conductors 2, 3 with appropriate electric energy. Advantageously, the heating element is covered with a flexible anti-embedding system 4 (such as aluminum foil), wherein the flexible anti-embedding system 4 acts as a mounted flexible system to prevent the embedding of the heating element in the area of pipe to be repaired. The performance of the heating element 1 can be further improved by wrapping the heating element 1, whether or not it is provided with the flexible anti-embedding system 4, with a thermal insulating layer 6, such as an insulating layer of rock wool, to thermally insulate the heating element 1 with respect to its environment. The thermal insulating layer 6 can in turn be regulated to obtain better control, particularly of the cooling phase of the repaired section.

The heating element 1, whether or not it is wrapped in the flexible anti-embedding system 4 (such as aluminum foil) and/or a thermal insulating layer 6 of rock wool, is held in place by removable attachment means 5 such as hook-and-loop strips like Velcro® or Scotch®.

The heating element 1 is then connected to the power supply device 20 by connectors 8. The power supply device 20, which can be a welding machine for example, capable of applying a programmable heating cycle to the heating element 1, either manually or automatically, comprises means for programming the power supply device 20 such as by reading a bar code.

Since the bar code corresponds to a certain type of pipe, characterized by the thermo-fusible material and by its dimensions, an internal memory of the power supply device 20 will supply the information needed by the internal programmer of the power supply device 20, in the form of electric signals routed respectively to a means of regulating the current (voltage, current intensity), in order to apply to the electric conductors 2, 3 of the heating element 1 the electric energy with a selected voltage or current intensity.

Figure 1:
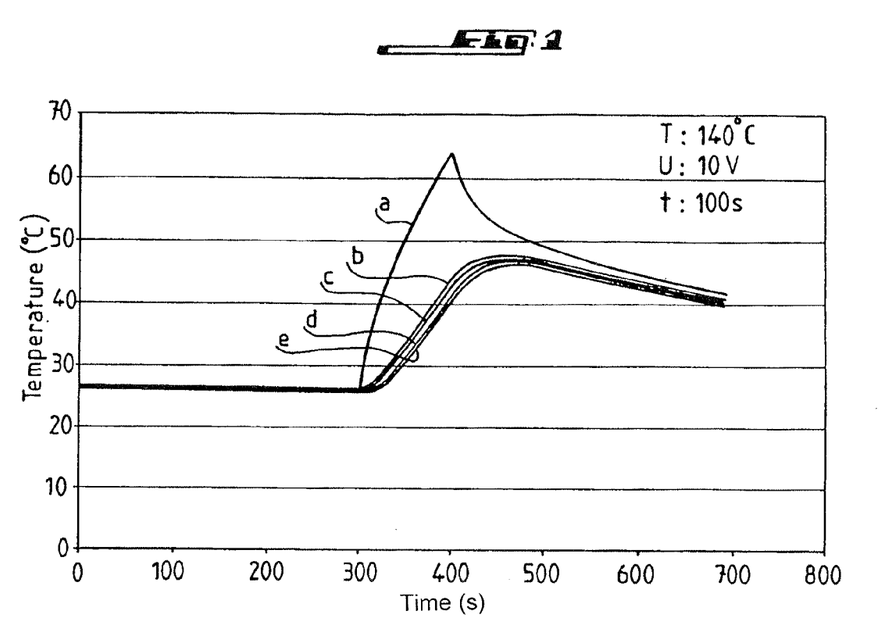
FIGS. 1 and 2 represent in diagrammatic form the change of temperature over time of the area to be repaired for which the method is implemented for different wall thicknesses (a, b, c, d, e), a corresponding to zero thickness, b, c, d to intermediate thicknesses from least to greatest, and e corresponding to the thickness of the pipe. The thermal cycle presented in FIG. 1 does not allow the repair of structural defects (such as gouges, for example) of the damaged pipe.
Figure 2:
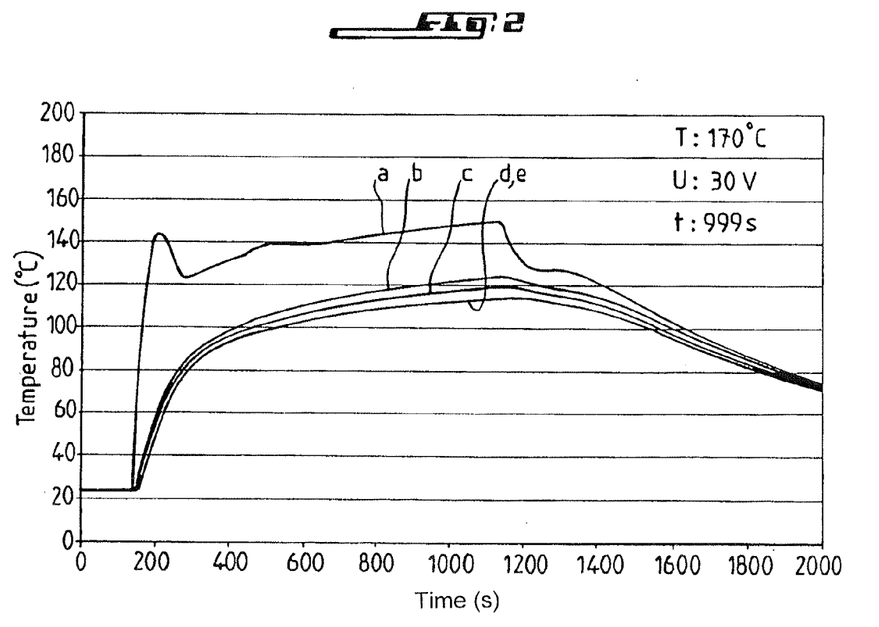

The repair of a polyethylene pipe having damage at A, B and C is then performed as follows (FIGS. 3 to 5 and 6 to 8):

an electric heating element is placed around the damaged area of the pipe, the heating element having the form of a mesh of electric wires;

securing of the heating mesh around the pipe;

connecting the heating mesh to an appropriate automatic machine;

carrying out a cycle of heating-cooling under the appropriate electrical and implementation conditions that have a profile of the type shown in the diagrams of FIGS. 1 or 2.

the nature of the heating-cooling cycle will be different depending on the type of damage to be repaired. For example, for internal damage of type A, B (FIGS. 3 to 5), the cycle will be adapted so as to obtain an annealing temperature close to the softening point of the material at the damaged area. For external damage of type C (FIGS. 6 to 8), the cycle will be adapted so as to obtain a temperature close to the melting point of the material at the damaged area.

The method of repair according to the invention is implemented by means of the following elements, shown in FIGS. 3 to 8:

a heating element composed, for example, of a mesh 1 produced by knitting a copper alloy wire forming electrical resistance and coated with a material acting as circuit breaker, for example by melting. This mesh can be produced specifically for a certain type of pipe characterized by its inside or outside diameter, the wall thickness of the pipe then being a function of this diameter. However, the mesh can also be made in the form of a rather large mat from which a mesh is cut of the necessary dimensions for the type of pipe to be repaired.

electrical conductors 2, 3 integral with the mesh 1 when the mesh is prefabricated in different sizes or individual conductors to be connected to the mesh when said mesh is cut from a mat as indicated above; these conductors are intended for connecting the mesh 1 to an automatic device 20 as a source of adjustable electric energy;

a flexible anti-embedding system 4 mounted on the heating element 1 to prevent its being embedded in the area to be repaired; this flexible system 4 is composed, for example, of aluminum foil;

a thermal insulating layer 6 for thermally insulating the heating element 1 from the environment; the thermal insulating layer 6 is composed, for example, of an element made of rock wool; this thermal insulating layer 6 can in turn be regulated for better control, particularly of the cooling phase of the heating/cooling cycle, by means of a suitable cooling system such as a fluid circulation system; this regulation of the cooling, like the heating phase of the heating/cooling cycle, can be accomplished advantageously by temperature measurement made by means of a temperature sensor, such as a thermocouple arranged on the mesh;

mechanical and electrical parts for connecting and securing, such as fasteners in the form of adhesive strips or Velcro® type strips to attach the rock wool element or the aluminum foil; or connectors for connecting the conductors 2, 3 to the power supply device 20 which can be an automatic welding machine; the connection parts can also comprise means of removable electrical connection, such as rivets, bolts or clips for attaching the conductors 2, 3 to a heating element made from a basic mesh of specific dimensions according to the dimensions of the damaged area of the pipe; the rivets, bolts or clips can also be used to attach to this mesh connecting wires that are part of the equipment accessories of the power supply device 20 which can be an automatic welding machine.

Figures 3, 4:
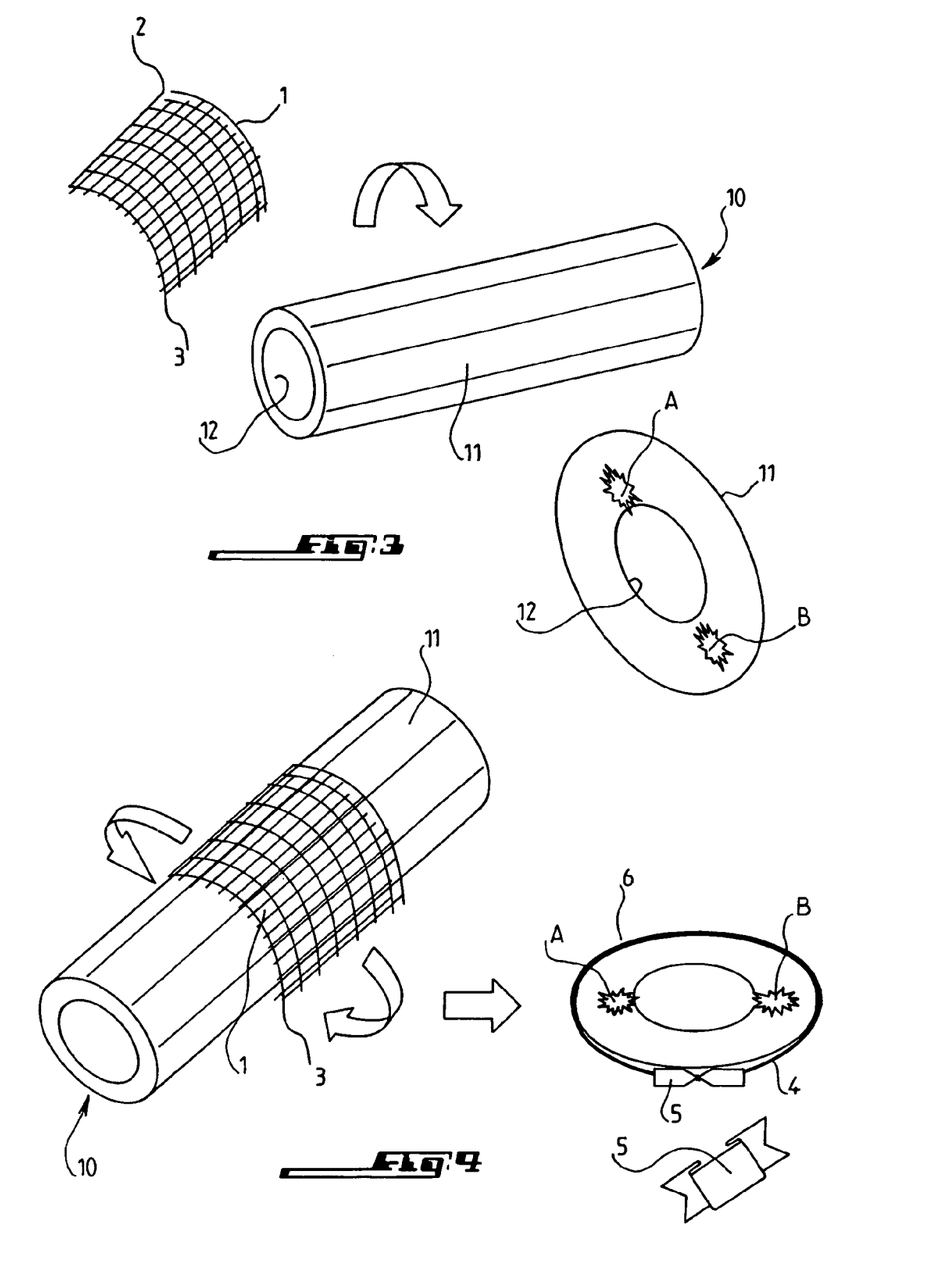
FIG. 3 represents handling procedures according to the method of the invention to prepare for the repair of a pipe with internal damage.
FIG. 4 shows the damaged area of the pipe of FIG. 3, wrapped for repair.

FIG. 3 diagrammatically represents a heating element 1 with its two connection leads 2, 3, which heating element is preshaped to be able to be arranged around the damaged area of a pipe 10 having an outer surface 11 and an inner surface 12. The pipe 10 is represented in this figure in perspective and in axial view with indication of two internal damaged places A, B located on the inner surface 12.

FIG. 4 represents these elements in the assembled condition, i.e., the pipe 10 with a heating element 1 applied to its outer surface 11 and wound completely around said pipe, since the pipe 10 has two diametrically opposite damaged places on the inner surface 12.

It is obvious that, without going beyond the scope of the present invention, two heating elements 1 could be applied, arranged diametrically opposite on the outer surface 11 of the pipe 10 and locally limited so as to heat only the immediate surroundings of each of the damaged places.

It is preferable to apply the heating element to the area having the defect to be repaired. However, as a practical matter, and in so far as the repair method must be adapted to extreme conditions like those found on a construction site, completely covering the object by the heating element may prove more suitable, although this will not alter the quality of the repair.

FIG. 4 represents the heating element 1, a flexible anti-embedding system 4 (such as aluminum foil) preventing embedding, and a layer of thermal insulating layer 6 applied to a pipe 10 having two damaged places A, B. The aluminum foil 4 is attached, for example, by fasteners 5 and the thermal insulating layer 6 is attached, for example, by Velcro® strips.

Figure 5:
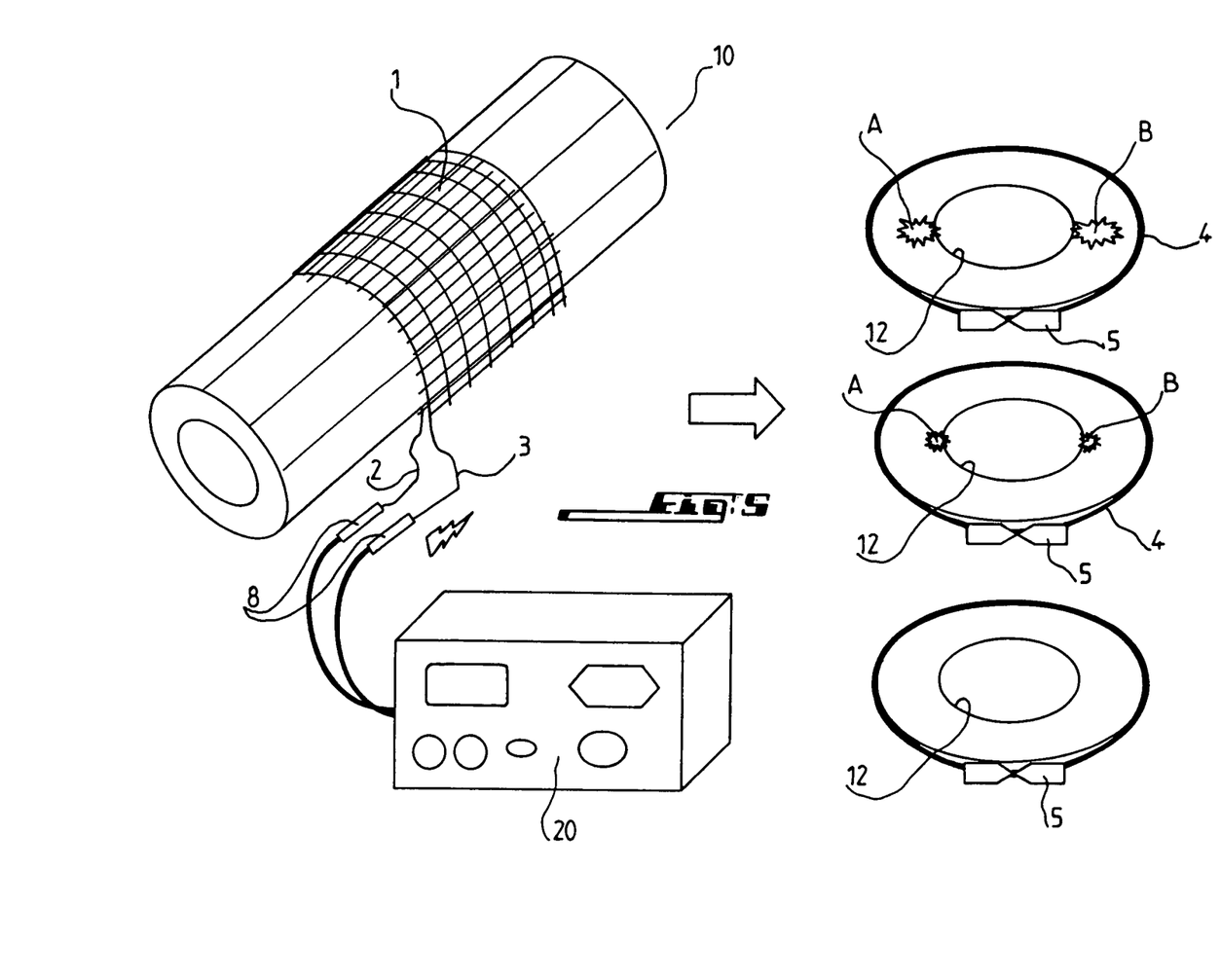
FIG. 5 shows the device of the invention applied for the repair of the pipe of FIGS. 3 and 4.

FIG. 5 represents the pipe 10 fitted with a heating element 1, a flexible anti-embedding system 4 (such as aluminum foil) and an insulating layer 6, first in perspective with its electrical connection to a power supply device 20 which can be an automatic welding machine, and then in two axial views at three different times during the implementation of the method of the invention, i.e. at the beginning of a heating-cooling cycle, during application and at the end of the cycle. More particularly, it can be seen that the damaged places A, B are reduced in size as the thermo-fusible material is melted and the wall of the pipe 10 is reshaped so as to result in a homogenous element with no defect or with a persistent defect but one that does not shorten the working life of the pipe.

Figures 6, 7:
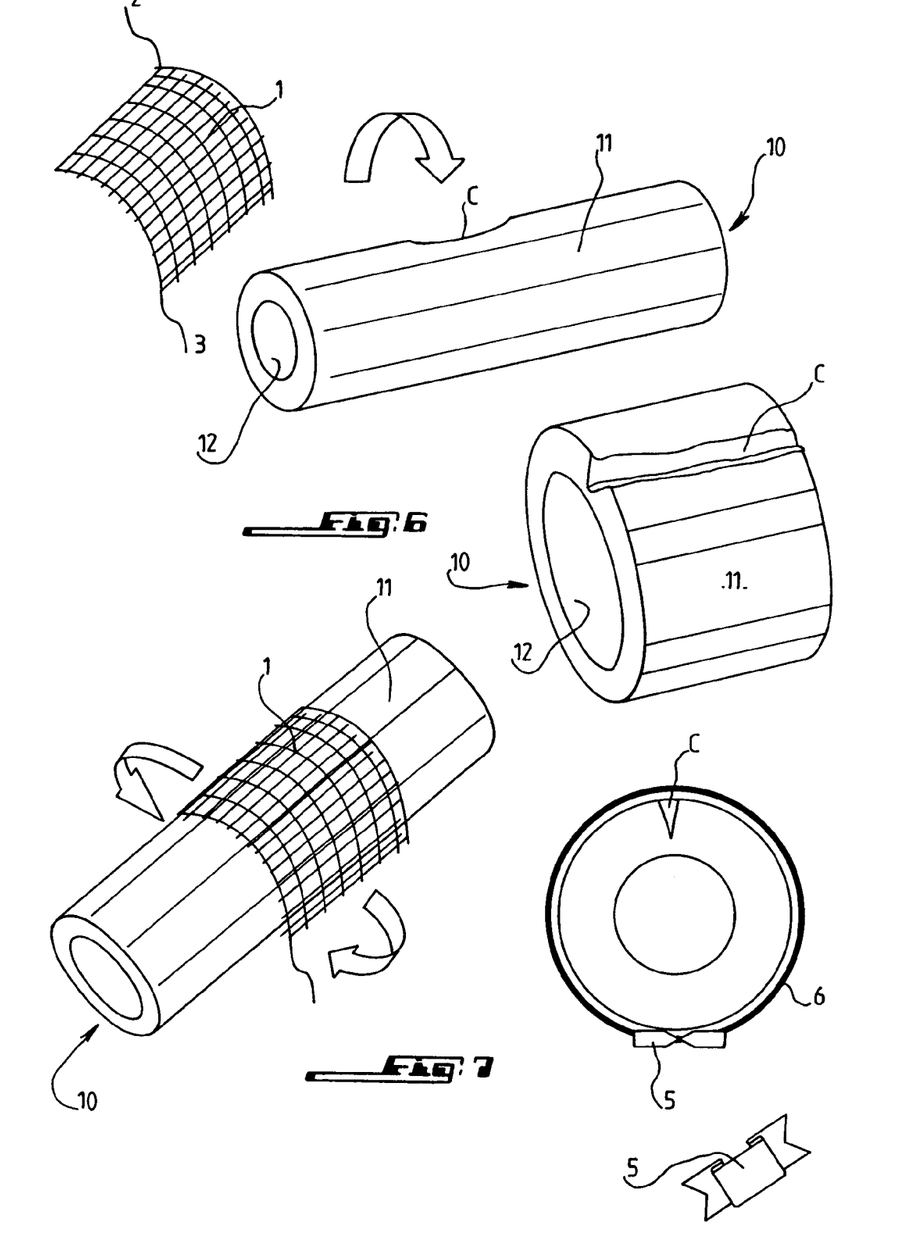
FIG. 6 shows the handling procedures according to the method of the invention for preparing to repair a pipe with external damage.
FIG. 7 shows the damaged area of the pipe of FIG. 6, wrapped for repair.

FIGS. 6 and 7 represent a situation of the pipe 10 comparable with the one shown in FIGS. 3 and 4. Thus, the pipe 10 with its outer surface 11 and inner surface 12 and its damage C in the form of a gouge on the outer surface 11, is wrapped, in the damaged area, with a heating element 1 having electric leads 2, 3 for the electrical connection to a power supply device 20 which can be an automatic welding machine. The heating element 1 is covered with a thermally insulating layer of rock wool 6, attached by means of fasteners 5.

Figure 8:
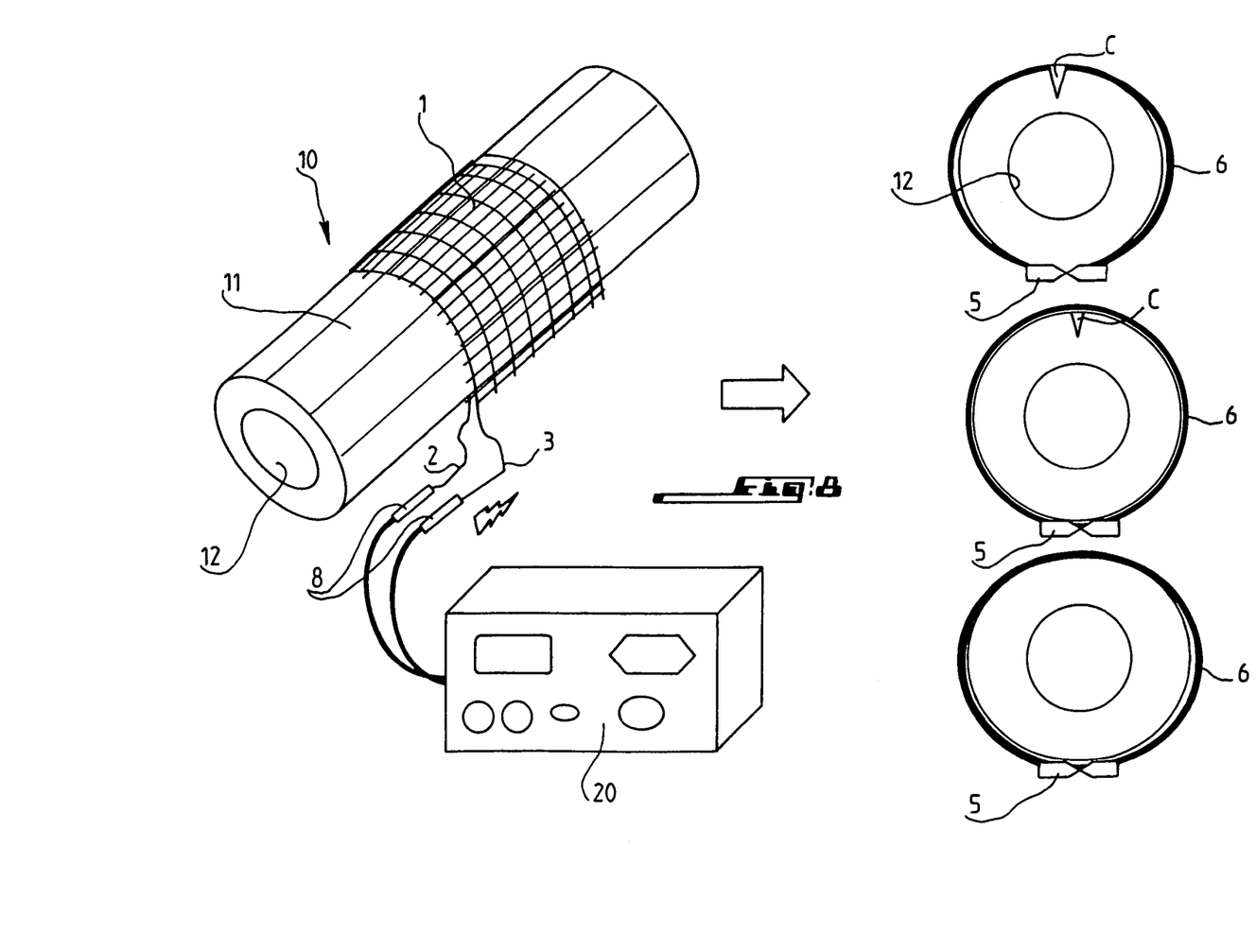
FIG. 8 shows the device of invention applied for the repair of the pipe of FIGS. 6 and 7.

As the electric energy is applied and the damaged area C is heated by the heating element 1, the size of the damage C is reduced until it disappears during the third of the three applications represented in FIG. 8.

The method of the invention has a number of advantages, among which are:
- the method can be implemented by conventional automatic welding machines already in use;
- the implementation of the method of the invention is independent of the size of pipe used; it can therefore be applied to the full range of pipe with diameters between 20 and 200 mm, sometimes even greater, for pipes with fluids as well as for tanks.
- the method does not require any specific training of personnel using the method;
- the method makes it possible to obtain a long-lasting repair;
- the price of the heating element, particularly in its "cut-off" version, makes it possible to consider it as a consumable item;
- the technique is well suited to all possible configurations of defects, as well as difficult configurations of terrain (raised enclosure, defect located on a generatrix other than the top one);
- not sensitive to the pipe's radius of curvature because of the flexibility of the heating element;
- flexibility of use of the device electric heating element 1 and adaptability to any surface (cylinder with square, circular, elliptical cross section, etc.);
- the course of the repair can be controlled at all times and can be made safe by integrating a circuit breaker in the heating element, such as by melting a coating material of the wire or by integrating a cooling system in the thermal insulating layer;
- the use of a mesh as heating element guarantees the uniform heating of the damaged area;

the implementation of the method of the invention is not limited to polyethylene pipe, but can be applied to any type of pipe or closed volumes (such as tanks) made of thermo-fusible material;

the repair can be made without a reinforcing saddle or other elements, a reinforcing technique that remains costly and difficult to implement.

Figure 9:
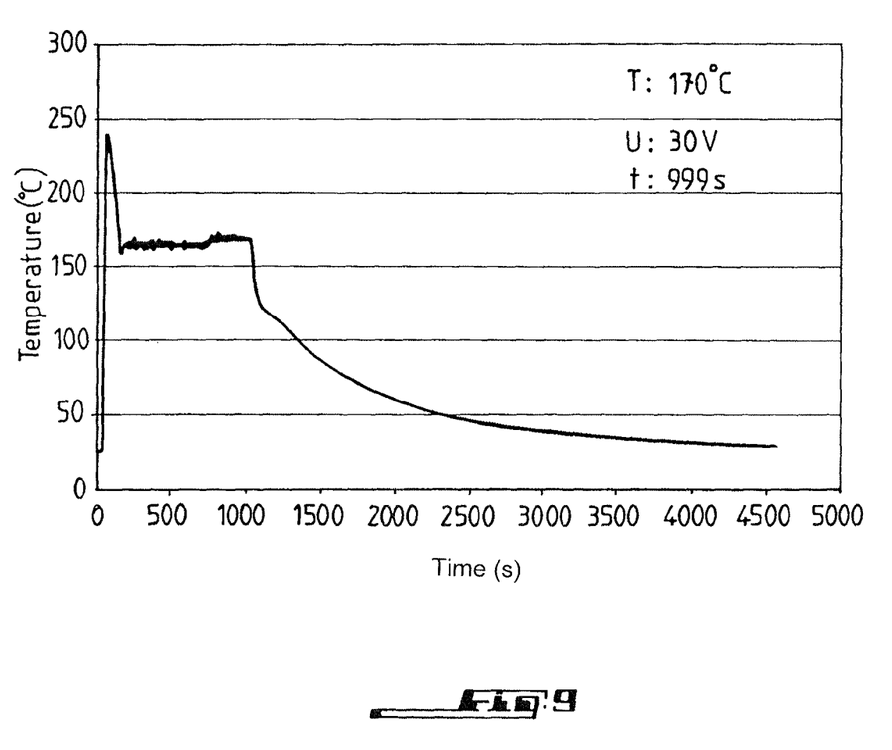
FIG. 9 shows an example of a heating-cooling cycle of the heating element. intended for the repair of damage of the external gouge type.

FIG. 9 represents an example of a heating-cooling cycle intended for the repair of damage of the external gouge type, to a depth of about 10% of the thickness of the pipe, the repair being made on a polyethylene pipe 63 mm in diameter, single wall thickness of 5.8 mm. The effect of this heating cycle is evaluated by a hydraulic pressure test at 80° C., with circumferential constraint of 4 MPa, on pipe having calibrated gouges made in the laboratory.

The method of the invention can be used as a preventive measure, particularly as a result of the great variety of geometry and of mesh construction that can be made industrially, for example to:

eliminate by moderate localized heating of internal defects of a part made of thermo-fusible material;

eliminate by annealing residual constraints of a part made of thermo-fusible material;

cross-linking in localized mass of thermo-fusible material; and drying/cross-linking of a glue at the interface of two parts made of thermo-fusible material.

The invention claimed is:

1. A method for repairing in situ a pipe or tank having internal damage at or next to an inner surface in which the internal damage underlies an external surface, wherein the pipe or tank is made of thermo-fusible material, the method comprising:

detachably installing an electric heating element on the pipe or tank to cover an area of the external surface of the pipe or tank where the internal damage underlies; and providing a power supply device to supply electric energy to the electric heating element to increase a local temperature at the area of the external surface where the internal damage underlies to melt the thermo-fusible material at the external surface where the internal damage underlies, and to maintain a temperature at the inner surface of the pipe or tank lower than a softening temperature of the thermo-fusible material, wherein the temperature is maintained in the inner surface of the pipe or tank where the internal damage is located at an annealing temperature which is below a softening point of the thermo-fusible material of the pipe or tank.

2. The method of claim 1, wherein the technical characteristic of the pipe or tank according to which the application of the electric energy is regulated is the wall thickness of the pipe or tank.

3. The method of claim 1, wherein the electric energy is applied to the electric heating element with a set value of voltage.

4. The method of claim 1, wherein the electric energy is applied to the electric heating element with a set value of current intensity.

5. The method of claim 1, wherein the heating element is covered with a thermal insulating layer.

6. The method of claim 5, wherein the insulating layer is a layer mounted after the heating element is installed.

7. The method of claim 1, further comprising: controlling a cooling phase of the pipe or tank being repaired.

8. The method of claim 1, further comprising: covering, with a heat conducting device, the area of the external surface of the pipe or tank where the internal damage underlies within the pipe or tank, wherein covering with the heat conducting device is performed prior to detachably installing the heating element to aid in preventing the heating element from being embedded within the pipe or tank after being repaired.

9. The method of claim 8, wherein the heat conducting device comprises aluminum foil.

10. The method of claim 1, wherein an application time profile of the supplied electric energy is controlled by the power supply device that includes at least one criterion for regulating the electrical energy to be applied.

11. The method of Claim 10, wherein the application time profile of the supplied electric energy is controlled by the power supply device in accordance to at least three parameters: the voltage delivered by the power supply device, the time during which the delivered voltage is applied and the temperature of the heating element.

12. The method of claim 11, wherein the application time profile of the supplied electric energy controlled by the power supply device also includes at least a fourth parameter:
the cooling speed.

13. The method of claim 1, wherein the pipe or tank contains a fluid while being repaired.

14. The method of claim 1, wherein the pipe or tank contains a fluid under pressure while being repaired.

15. The method of claim 1, wherein the pipe or tank is made of thermo-fusible material selected from the group consisting of polyethylene, polyamide, polybutylene, polypropylene and polyvinylchloride.

16. The method of claim 1, wherein the pipe or tank is made of thermo-fusible material comprises polyethylene.

17. The method of claim 1, wherein the internal damage is selected from the group consisting of voids, inclusions, flattened-straightened areas, and extrusion defects.

18. The method of claim 1, wherein the electric heating element comprises a metal mesh made of a metal alloy.

19. The method of claim 1, wherein the thermal insulating layer comprises rock wool.

20. The method of claim 1, wherein the power supply device comprises a welding machine capable of applying a heating cycle to the electric heating element and capable of reading a bar code.

* * * * *